US009976595B2

(12) United States Patent
Kim

(10) Patent No.: US 9,976,595 B2
(45) Date of Patent: May 22, 2018

(54) HYBRID FOIL BEARINGS HAVING INTEGRATED GAS FLOW PATHS

(71) Applicant: Daejong Kim, Arlington, TX (US)

(72) Inventor: Daejong Kim, Arlington, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days. days.

(21) Appl. No.: 15/237,916

(22) Filed: Aug. 16, 2016

(65) Prior Publication Data

US 2017/0051788 A1    Feb. 23, 2017

Related U.S. Application Data

(60) Provisional application No. 62/208,010, filed on Aug. 21, 2015.

(51) Int. Cl.
*F16C 32/06* (2006.01)
*F16C 17/02* (2006.01)

(52) U.S. Cl.
CPC ........ *F16C 32/0622* (2013.01); *F16C 17/024* (2013.01)

(58) Field of Classification Search
CPC .... F16C 17/024; F16C 32/06; F16C 32/0622; F16C 32/0625
See application file for complete search history.

(56) References Cited

U.S. PATENT DOCUMENTS

| 4,701,060 A | * | 10/1987 | Gu | ........................ | F16C 17/024 |
| | | | | | 384/106 |
| 5,885,004 A | * | 3/1999 | Scharrer | ............... | F16C 17/024 |
| | | | | | 384/103 |
| 6,964,522 B2 | | 11/2005 | Kang | | |
| 8,500,331 B2 | | 8/2013 | Kim | | |
| 2002/0097927 A1 | | 7/2002 | Lee | | |

FOREIGN PATENT DOCUMENTS

| CA | 2881803 A1 | * | 2/2014 | ............ | F16C 17/024 |
| JP | 2005036866 A | * | 2/2005 | ............ | F16C 17/024 |

OTHER PUBLICATIONS

Kim, et al. "Design of Three-Pad Hybrid Air Foil Bearing and Experimental Investigation on Static Performance at Zero Running Speed", Journal of Engineering for Gas Turbines and Power; ASME; Dec. 2010, vol. 132.
Wang, et al., "Experimental Identification of Force Coefficients of Large Hybrid Air Foil Bearing", Journal of Engineering for Gas Turbines and Power, Mar. 2014, vol. 136.
Kumar, et al., "Static performance of hydrostatic air bump foil bearing", Tribology International 43, 2010.
(Continued)

*Primary Examiner* — Phillip A Johnson
(74) *Attorney, Agent, or Firm* — Thomas | Horstemeyer, LLP

(57) ABSTRACT

In one embodiment, a hybrid foil bearing includes a bearing sleeve, multiple inner foils provided within the sleeve, the foils having gas outlets from which pressurized gas can be injected into an interior of the bearing, and integrated gas flow paths that radially extend through the bearing sleeve and deliver the gas to the gas outlets.

16 Claims, 11 Drawing Sheets

(56) References Cited

OTHER PUBLICATIONS

Agrawal, et al. "Foil Air/Gas Bearing Technology—An Overview", Presented at the International Gas Turbine and Aeroengine Congress and Exhibiation, Jun. 2, 1997.
Bryant, et al., "On the Thermodynamics of Degradation", Proceedings of the Royal Society, 2008.
Doeling, et al., "An experimental study of the correlation between wear and entropy flow in machinery components", Jounral of Applied Physics, Sep. 1, 2000.
Kim, et al., "Hydrostatic air foil bearings: Analytical and experimental investigation", Tribology International; 2009.
Kim, et al., "Start-stop characteristics and thermal behavior of a large hybrid airfoil bearing for aero-propulsion applications", Journal of Engineering for Gas Turbines and Power, Mar. 2012.
Kim, D., and Varrey, M., 2012, "Imbalance Response and Stability Characteristics of a Rotor Supported by Hybrid Air Foil Bearings," STLE Tribology Transactions, 55(4), pp. 529-538.

\* cited by examiner ical applications are much lower than the load capacity of the bearing measured at the design speed to enable many start/stop cycles without failure of the bearing or shaft, or their coatings.

HYBRID FOIL BEARINGS HAVING INTEGRATED GAS FLOW PATHS

CROSS-REFERENCE TO RELATED APPLICATION

This application claims priority to co-pending U.S. Provisional Application Ser. No. 62/208,010, filed Aug. 21, 2015, which is hereby incorporated by reference herein in its entirety.

BACKGROUND

Air foil bearings that use air as a lubricant for a spinning shaft have become popular in small high speed turbomachinery, such as air cycle machines, small turbo-compressors/blowers, and micro gas turbines. Such bearings typically comprise one or multiple smooth top foils that are supported by an elastic support structure, such as a corrugated bump foil, that provides stiffness and damping.

The load capacity of foil bearings, which is measured at their full design speed, may be large enough for the foil bearings to be considered for applications beyond their current size limits. However, this load capacity is achieved because of the hydrodynamic action at full speed, which diminishes as the shaft slows down. The load capacity during start up and shut down relies only on the wear resistance of the materials of the shaft and top foil, or coatings on these components. Therefore, the average static bearing pressure (static load divided by diameter times length) of the foil bearings adopted in most commercial applications are much lower than the load capacity of the bearing measured at the design speed to enable many start/stop cycles without failure of the bearing or shaft, or their coatings.

Although surface coatings help to reduce the wear and friction to some extent, dry rubbing is a thermodynamically irreversible process that inevitably causes wear. Hybrid foil-magnetic bearings are one option to avoid the dry rubbing of the large foil bearings. However, the foil bearing is not the main bearing in such applications and acts only as a mechanical catcher bearing during electric system failure. Thus, the foil bearings may not survive many emergency stops. Alternative hybrid foil bearings that add hydrostatic injection to conventional foil bearings may be a more viable solution. Hybrid foil bearings combine the inherent hydrodynamic pressure of conventional foil bearings with the hydrostatic lift generated by pressurized gas (e.g., air) injected through orifices attached to the top foil to minimize or even eliminate dry rubbing during starts and stops. The hydrostatic injection can be turned off once the rotor reaches lift-off speed or it can be maintained as the hydrostatic injection is an excellent cooling mechanism. Needed, however, are hybrid foil bearing designs that are suitable for commercial applications.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, hybrid foil bearings that combine the inherent hydrodynamic pressure of conventional foil bearings with the hydrostatic lift generated by pressurized injected gas may be preferable in commercial applications in which bearing and/or shaft wear is a problem during start up or shut down. Disclosed herein are hybrid foil bearings that can be used in such applications. The disclosed hybrid foil bearings comprise multiple gas flow paths through which a gas can be injected into the bearing to support a shaft when not spinning or spinning at slow speeds (e.g., during start up and shut down). In some embodiments, the flow paths extend radially through the bearing.

In the following disclosure, various specific embodiments are described. It is to be understood that those embodiments are example implementations of the disclosed inventions and that alternative embodiments are possible. All such embodiments are intended to fall within the scope of this disclosure.

Figure 1:
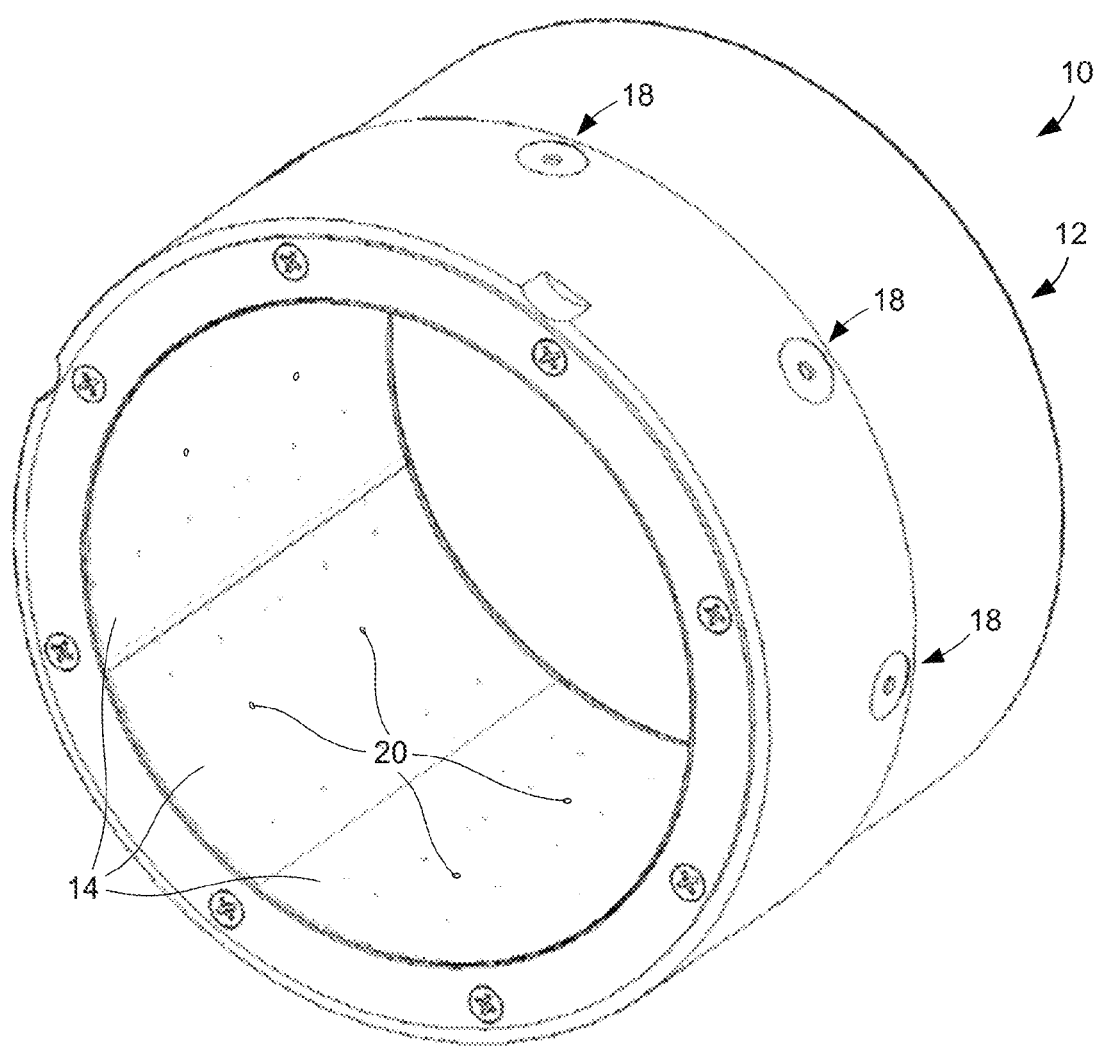
FIG. 1 is a perspective view of a first embodiment of a hybrid foil bearing.
Figure 2:
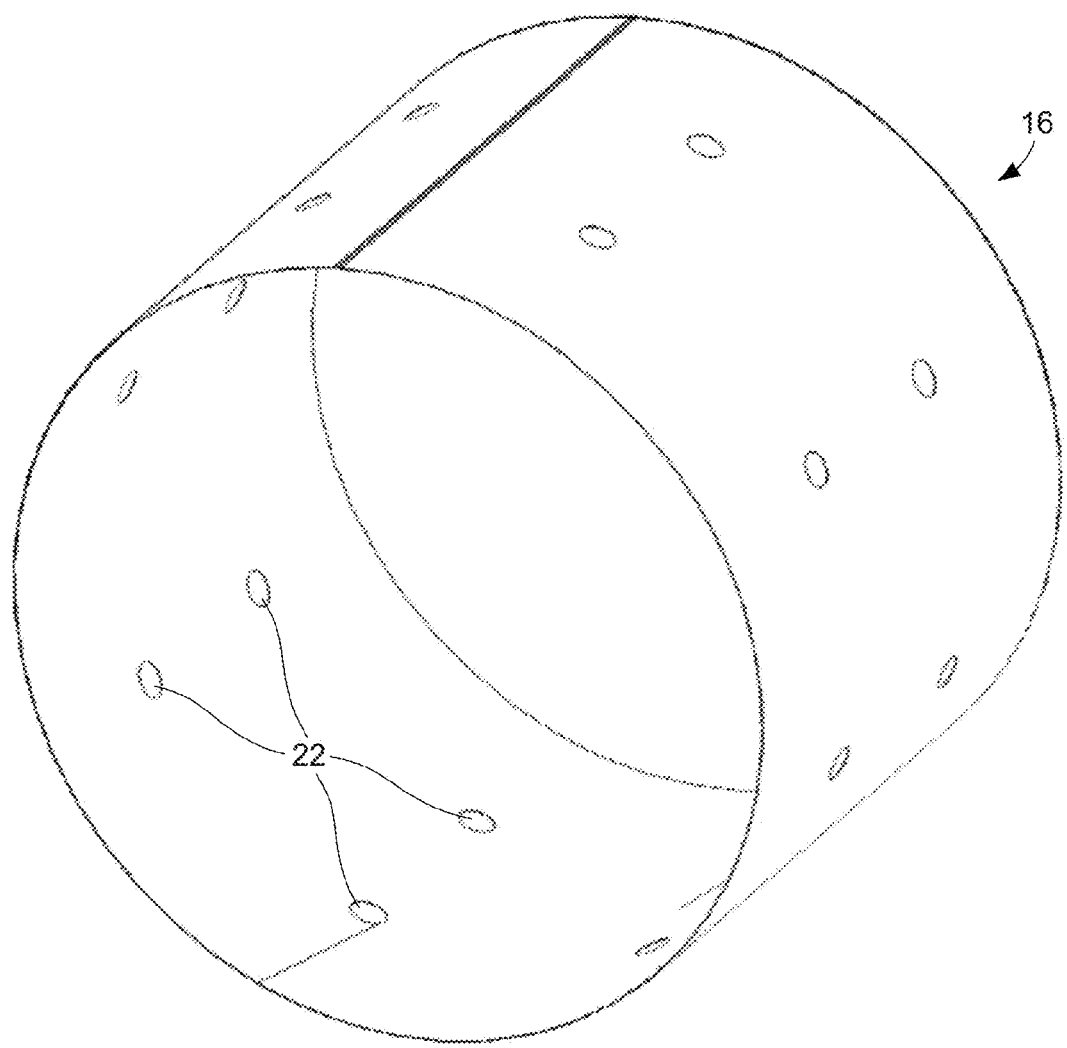
FIG. 2 is a perspective view of an embodiment of a top foil that can be used in the hybrid foil bearing of FIG. 1.

FIGS. 1-7 illustrate a first embodiment of a hybrid foil bearing 10 in its fully assembled state. As indicated in this figure, the bearing 10 includes an outer bearing sleeve 12 that houses multiple inner foils 14 of the bearing. In some embodiments, these foils 14 are intermediate foils that are configured to support one or more top foils, such as the top foil 16 shown in FIG. 2. In the embodiment of FIG. 2, the top foil 16 comprises a continuous sheet of material having overlapping ends that, when brought together, form a generally cylindrical foil. In other embodiments, no additional top foil is used and the foils 14 therefore act as multiple top foils. As is further shown in FIG. 1, the bearing sleeve 12 comprises multiple gas inlets 18 that each comprise part of an integrated gas flow path through which a pressurized gas can be supplied to the interior of the bearing 10.

With further reference to FIG. 1, the foils 14 are aligned edge-to-edge with each other along an axial or longitudinal direction of the hybrid foil bearing 10. In the illustrated embodiment, the bearing 10 includes eight such foils 14. It is noted, however, that a greater or lesser number of foils 14 can be used, if desired. Provided in each foil 14 is one or more gas outlets 20 through which the pressurized gas supplied to the bearing 10 through the gas inlets 18 can be injected into the interior of the bearing toward the supported shaft (not shown). These outlets 20 also comprise part of the gas flow paths of the bearing 10. In cases in which an additional top foil is used in the bearing 10, the top foil comprises flow openings that align with the outlets 20 so that the gas ejected from the outlets can pass through the top foil. FIG. 2 illustrates an example of such openings 22 provided through the top foil 16.

Figure 3:
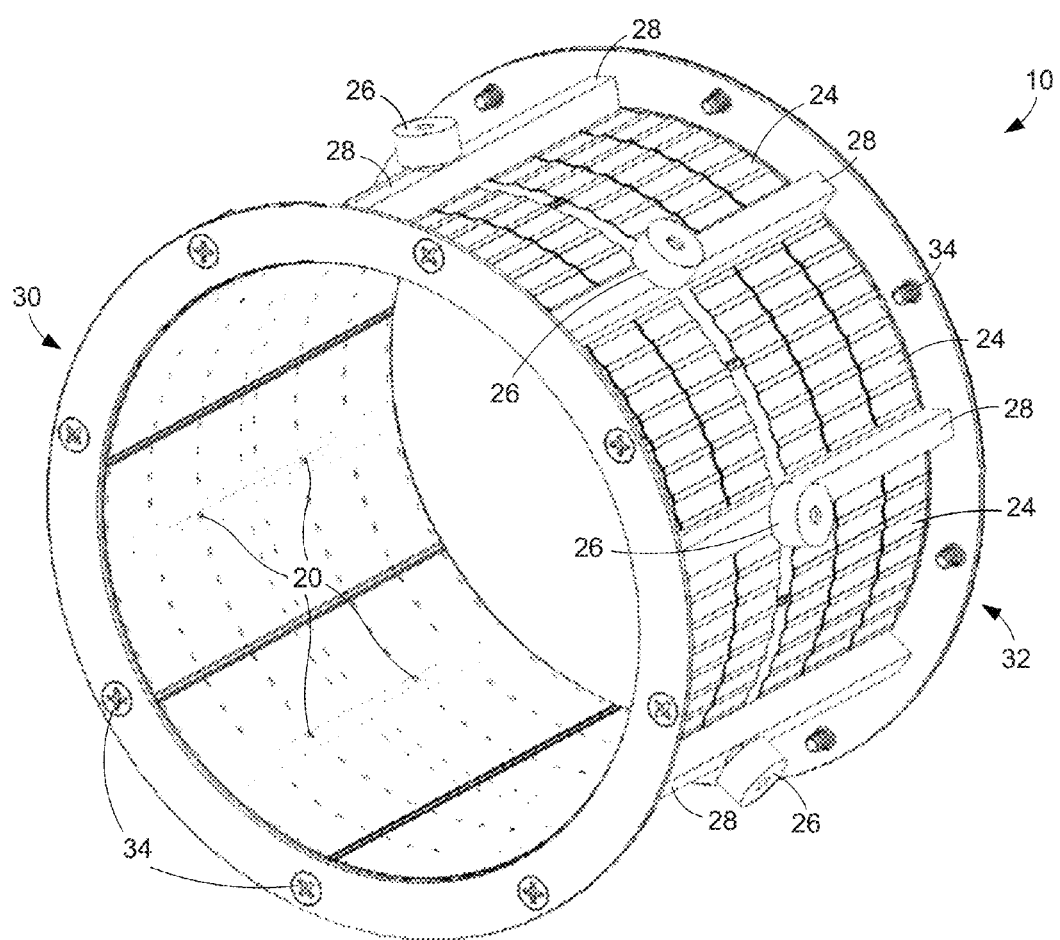
FIG. 3 is a perspective view of the hybrid foil bearing of FIG. 1 with a sleeve of the bearing removed.

FIG. 3 shows the hybrid foil bearing 10 with the outer bearing sleeve 12 removed. Visible in this figure are inner bump foils 24 that lie beneath the foils 14 and provide support and cushion the foils. In some embodiments, the bump foils 24 are corrugated sheet metal, however, any spring structure could be used. Also visible in FIG. 3 are gas flow plugs 26 and gas distribution members 28 that are associated with each foil 14 and that also comprise part of the gas flow paths. The gas flow plugs 26 are adapted to be received within (e.g., threaded into) the gas inlets 18 provided in the bearing sleeve 12. As described in greater detail below, the pressurized gas provided to the gas inlets 18 can flow through the bearing sleeve 12, through the flow plugs 26, through the gas distribution members 28, and out of the gas outlets 20 of the foils 14. Not shown in FIG. 3 are narrow bump foils that can be provided beneath the gas distribution members 28 that support and cushion the members.

Also shown in FIG. 3 are mounting plates 30 and 32 that are used to secure the gas distribution members 28 and the foils 14 within the outer bearing sleeve 12. As depicted in FIG. 3, the mounting plates 30, 32 can be secured to opposed ends of the bearing sleeve 12 with threaded fasteners 34, such as screws. In other embodiments, the mounting plates 30, 32 can be omitted if the foils 14 are directly secured to the bearing sleeve 12.

Figure 4:
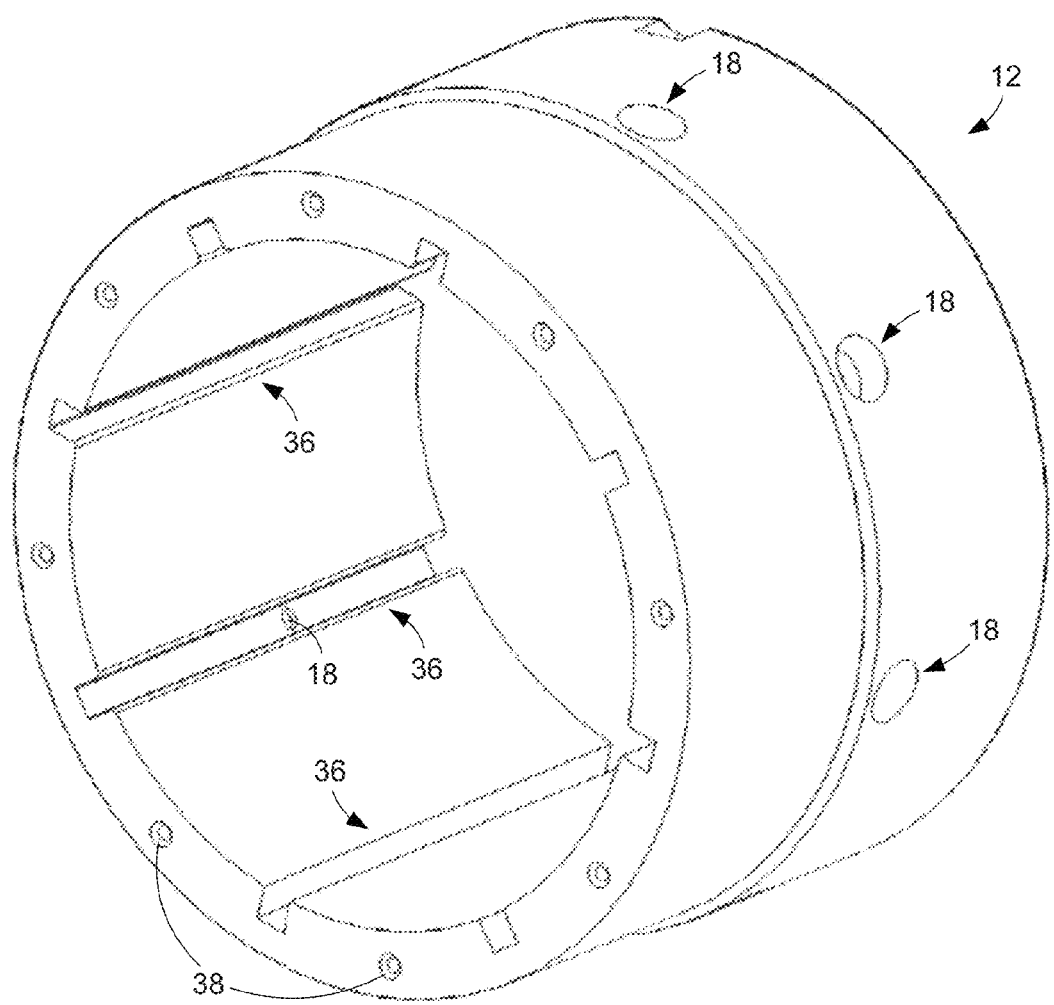
FIG. 4 is a perspective view of the bearing sleeve of the hybrid foil bearing of FIG. 1 with the other components of the bearing removed.

FIG. 4 shows the outer bearing sleeve 12 separate from the other components of the hybrid foil bearing 10. As shown in this figure, the bearing sleeve 12 includes multiple elongated inner channels 36 that extend along the axial or longitudinal direction of the sleeve. Each channel 36 is adapted to receive a gas distribution member 28 of one of the foils 14. Accordingly, the channels 36 are also adapted to receive the narrow bump foils that underlie the gas distribution members 28. As is further shown in FIG. 4, the bearing sleeve 12 includes threaded openings 38 that are adapted to receive the threaded fasteners 34 shown in FIG. 3.

Figure 5A:
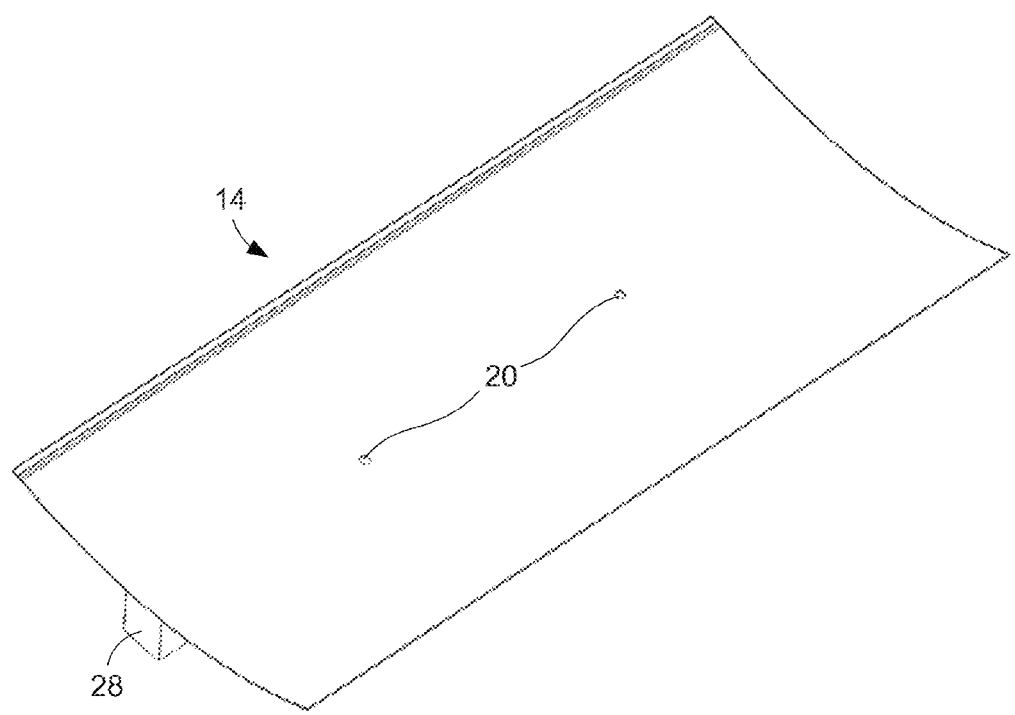
FIG. 5A is a top perspective view of an embodiment of a foil that can be used in the hybrid foil bearing of FIG. 1.
Figure 5B:
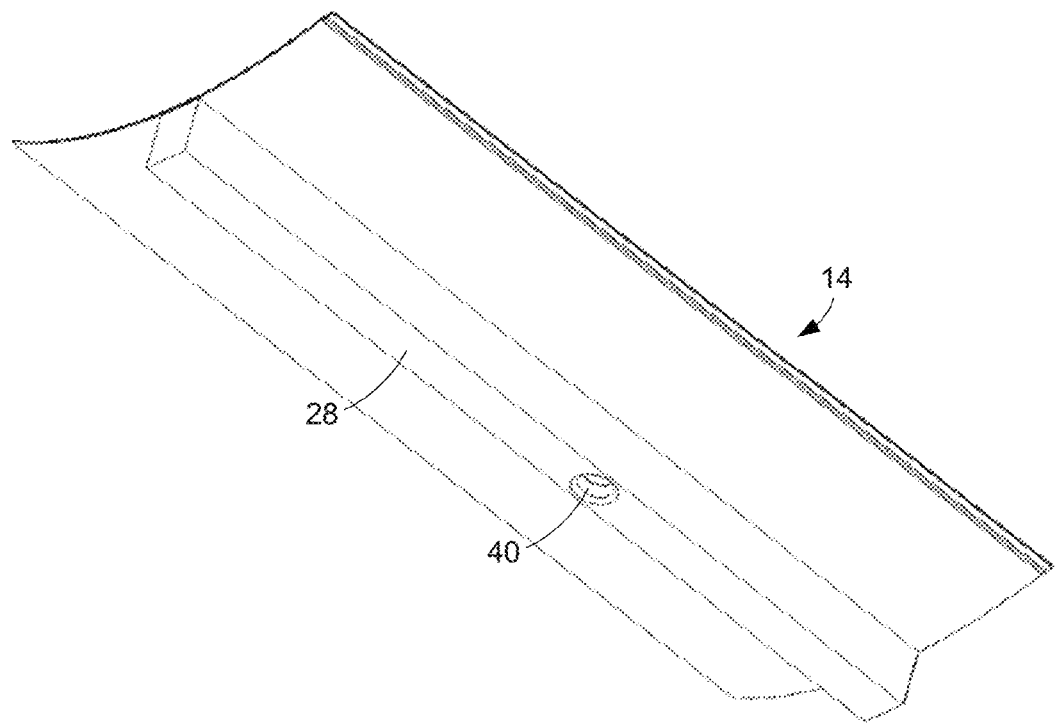
FIG. 5B is a bottom perspective view of the foil of FIG. 5A.

FIGS. 5A and 5B show one of the foils 14 separate from the remainder of the hybrid foil bearing 10 except for the foil's gas distribution member 28, which can be attached (e.g., welded) thereto. As illustrated in these figures, the foil 14 is curved to form part of the cylindrical inner surface of the bearing 10. As is also illustrated in FIGS. 5A and 5B, the foil 14 includes two gas outlets 20 that are spaced from each other along the axial or longitudinal direction of the foil. Each of the gas outlets 20 are fed by the gas distribution member 28, which distributes the pressurized gas it receives through an opening 40 provided in the member.

Figure 6A:
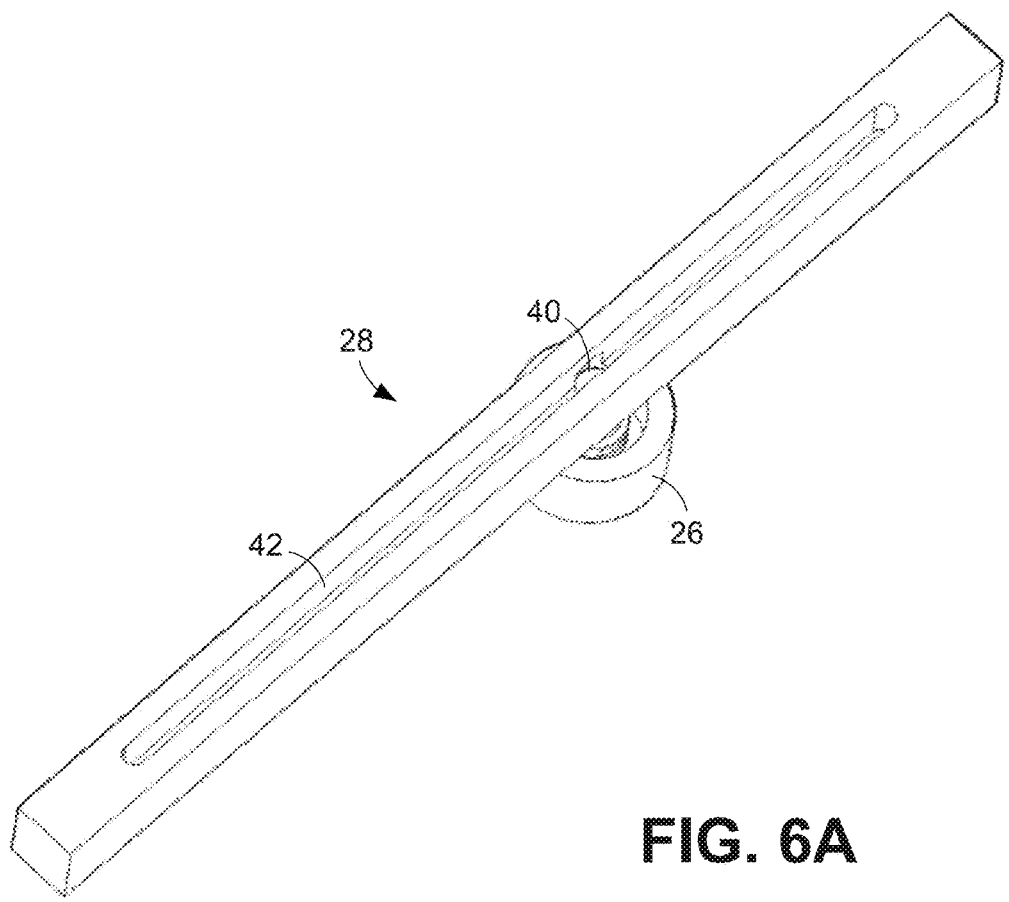
FIG. 6A is a top perspective view of an embodiment of a gas distribution member and gas flow plug that can be used in the foil of FIGS. 5A and 5B.
Figure 6B:
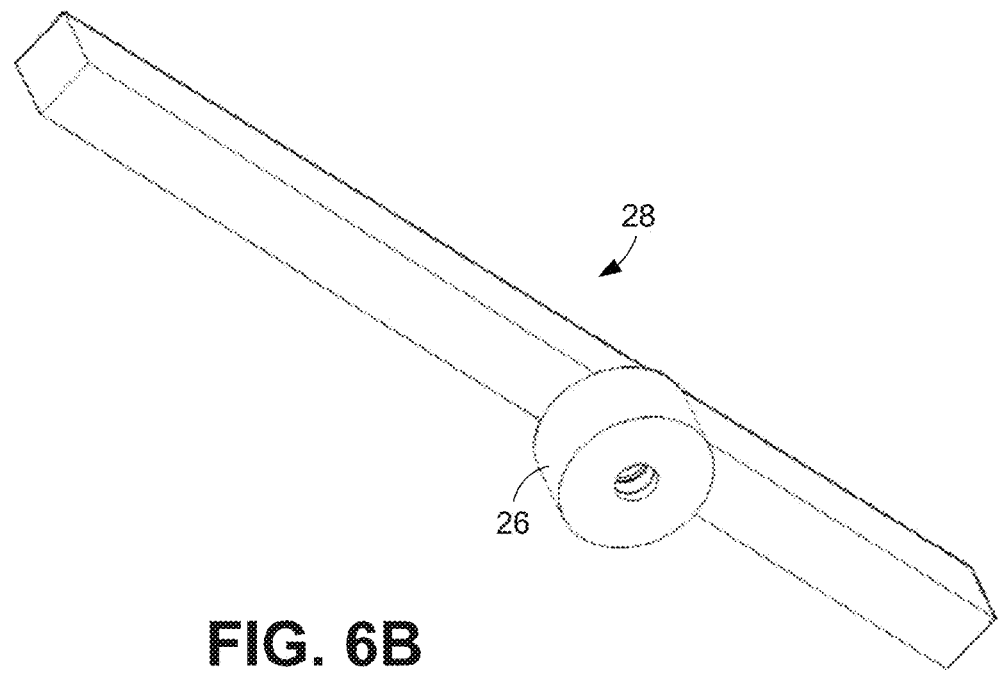
FIG. 6B is a bottom perspective view of the gas distribution member and gas flow plug of FIG. 6A.

FIGS. 6A and 6B show one of the gas distribution members 28 separated from its foil 14 and with its associated gas flow plug 26 connected. As is apparent from FIG. 6A, the gas distribution member 28 is an elongated member that comprises an elongated inner channel 42 that extends along the axial or longitudinal direction of the member. During operation of the hybrid foil bearing 10, pressurized gas provided to the gas distribution member 28 passes through the opening 40 and flows along the inner channel 42 to the gas outlets 20 of the associated foil 14.

Figure 7:
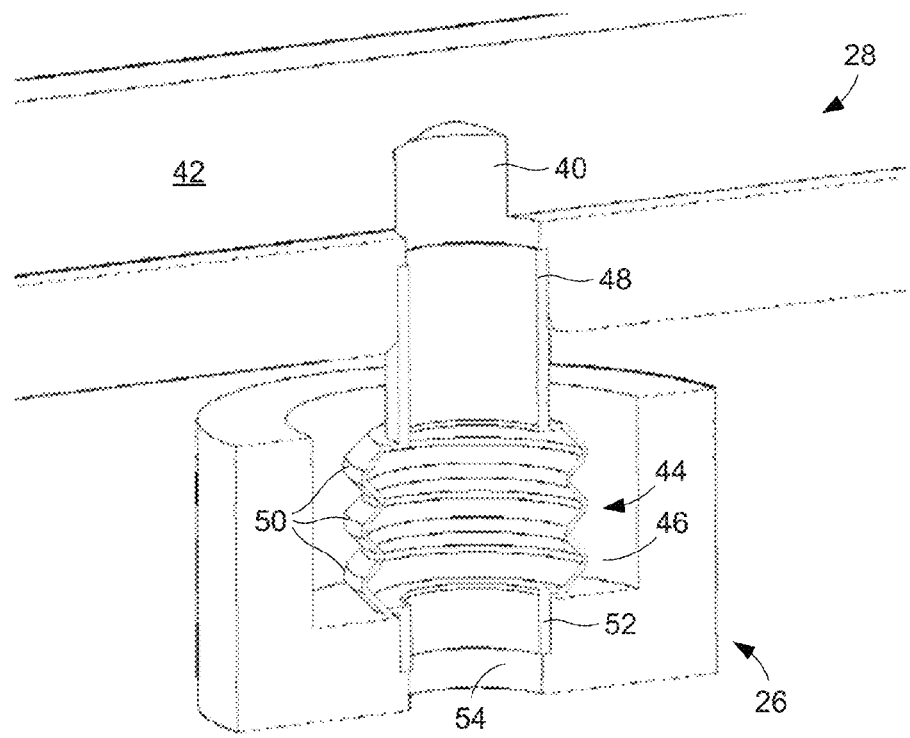
FIG. 7 is a cross-sectional perspective view of the gas distribution member and gas flow plug of FIGS. 6A and 6B.

FIG. 7 is a detail view that shows an example connection between the gas distribution member 28 and the gas flow plug 26. In this embodiment, the gas distribution member 28 and the gas flow plug 26 are connected together with an internal bellows 44 that is flexible and that, therefore, can accommodate misalignment between the member and the plug/or and radial movement of either component during use of the bearing 10. In some embodiments, the bellows 38 is made of a metal material, such as stainless steel, spring steel, or a nickel-chromium-based alloy (e.g., Inconel). In other embodiments, the bellows 38 can be made of a polymeric material. The bellows 44 is provided within an inner space 46 of the gas flow plug 26, which is hollow, and includes a first cylindrical tube 48 that is received within the opening 40 of the gas distribution member 28 with a snug interference fit. Positioned radially outward from the tube 48 are corrugations 50 of the bellows 44 and a second cylindrical tube 52 that seats within a stepped opening 54 formed in the gas flow plug 26, also with a snug interference fit. Notably, in other embodiments, the bellows 38 can be replaced by a simple flexible (e.g., plastic) tube.

During use of the hybrid foil bearing 10, pressurized gas can be pumped through the gas inlets 18 formed in the outer bearing sleeve 12 and into the openings 54 formed in the gas flow plugs 26. The gas then passes through the bellows 44 contained in the flow plugs 26 and into the inner channels 42 of the gas distribution members 28. The gas distribution members 28 then distribute this gas to the gas outlets 20 formed in the foils 14 so that the gas can be injected into the bearing 10 toward the shaft that is supported within the bearing. As can be appreciated from the above discussion, the gas inlets 18, gas flow plugs 26, bellows 44, gas distribution members 28, and gas outlets 20 together define multiple radial flow paths through which the pressurized gas can be radially injected into the bearing 10 to provide a cushion of gas that supports the shaft.

FIGS. 8-11 illustrate a second embodiment of a hybrid foil bearing 60, which is similar in many respects to the hybrid foil bearing 10 shown in FIGS. 1-7. Due to this similarity, the discussion of the bearing 60 provided herein is focused on the differences between it and the bearing 10. Beginning with FIG. 8, the bearing 60 includes an outer bearing sleeve 62 that houses multiple inner foils 64 that are supported and cushioned by bump foils 66. In this embodiment, the bearing 60 includes three foils 64. The bearing sleeve 62 comprises multiple gas inlets 68 (e.g., one for each foil 64) through which a pressurized gas can be supplied to the interior of the bearing 60. Provided in each foil 64 is a gas outlet 70 through which the pressurized gas supplied to the bearing 60 through the gas inlets 68 can be injected into the interior of the bearing toward the supported shaft (not shown).

Figure 9:
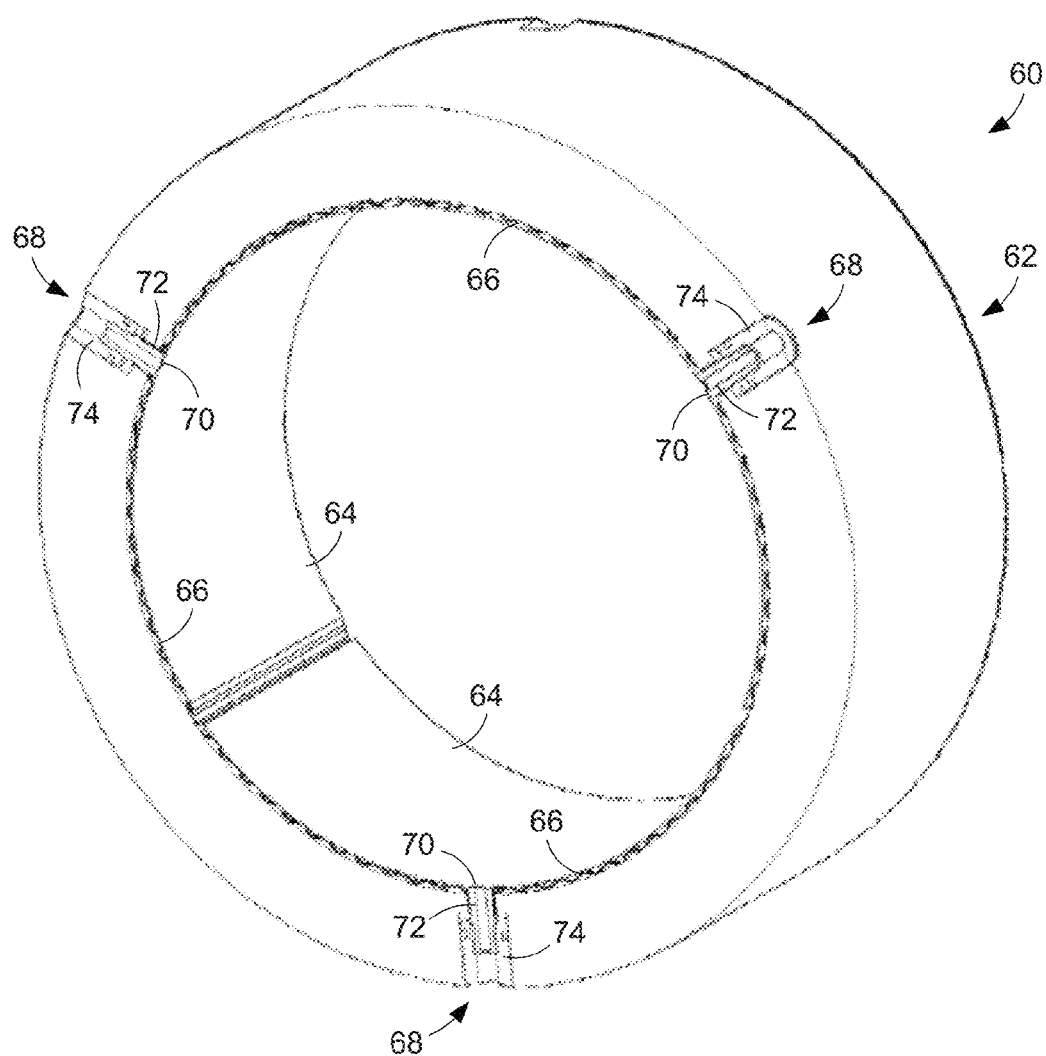
FIG. 9 is a cross-sectional perspective view of the hybrid foil bearing of FIG. 8.

FIG. 9 shows the hybrid foil bearing 10 in a transverse cross-section taken along the gas inlets 68 so as to reveal integrated gas flow paths with which the pressurized gas is injected into the bearing. These flow paths are in part formed by gas flow tubes 72 associated with each foil 64 and gas flow plugs 74 associated with the gas inlets 68 that receive the gas flow tubes.

Figure 10A:
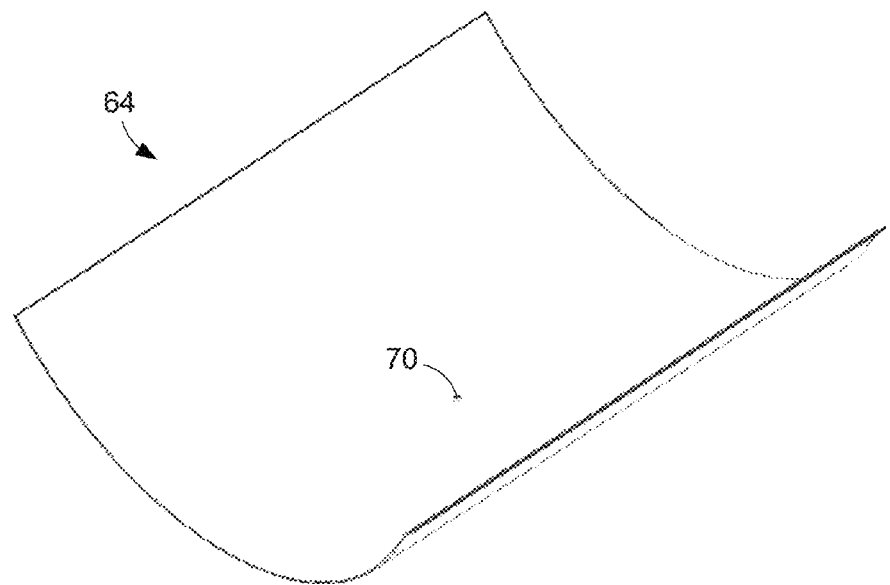
FIG. 10A is a top perspective view of an embodiment of a foil that can be used in the hybrid foil bearing of FIG. 8.
Figure 10B:
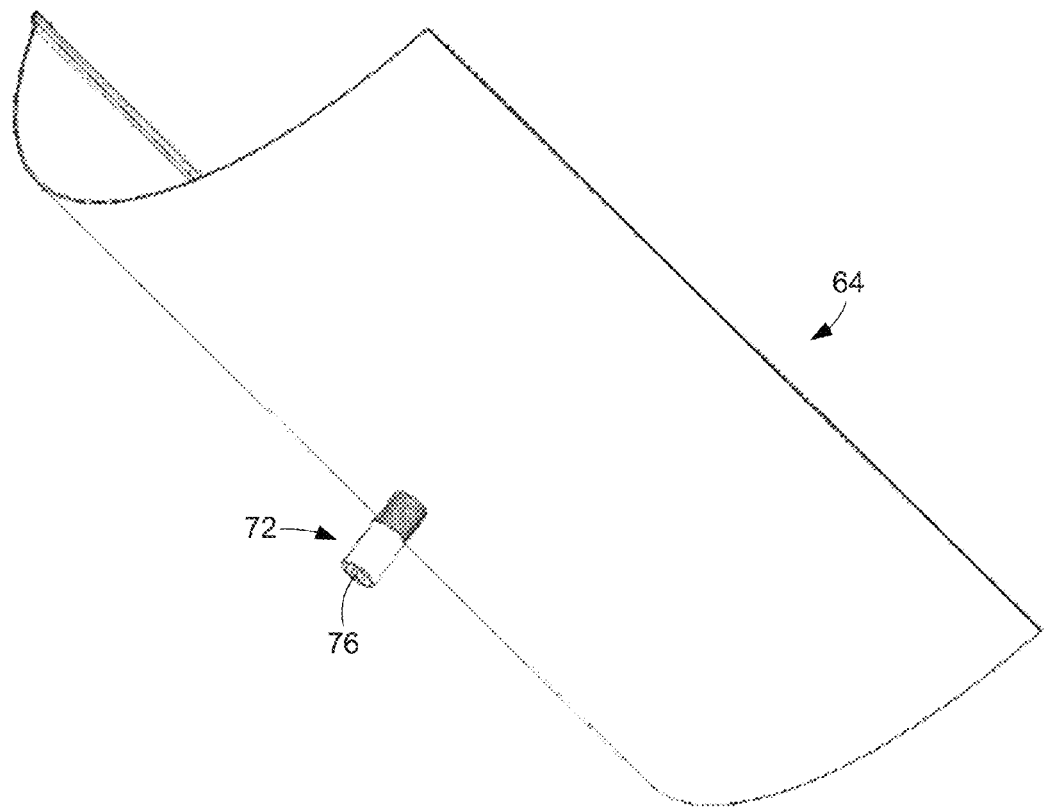
FIG. 10B is a bottom perspective view of the foil of FIG. 10A.

FIGS. 10A and 10B show one of the foils 64 separate from the remainder of the components of the hybrid foil bearing

60. As illustrated in these figures, the foil 64 is curved to form part of the cylindrical inner surface of the bearing 60. As is also illustrated in FIGS. 5A and 5B, the foil's gas flow tube 72 extends radially outward from the back or outer side of the foil (facing away from the shaft) and includes an inner passage 76 through which pressurized gas can flow to the gas outlet 70. Like the gas distribution members 28, the gas flow tube 72 can be secured (e.g., welded) to the foil 14.

Figure 11:
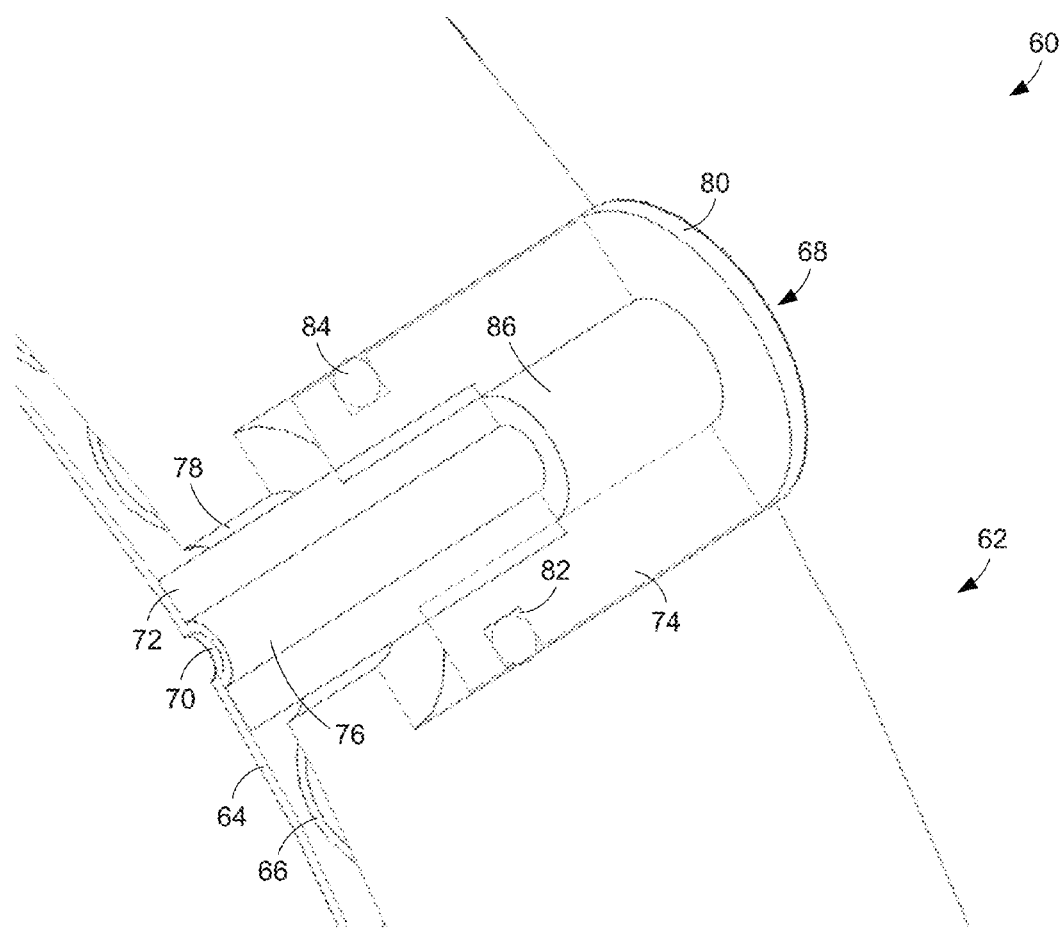
FIG. 11 is a cross-sectional perspective view of an embodiment of a gas flow paths that can be used in the hybrid foil bearing of FIG. 8.

FIG. 11 is a detail view of one gas flow path that shows an example connection between the gas flow tube 72 and the gas flow plug 74 within the assembled hybrid foil bearing 60. As shown in this figure, the gas flow tube 72 extends through a relatively narrow inner portion 78 of the gas inlet 68 formed in the bearing sleeve 62 and the gas flow plug 74 is inserted into a wide outer portion 80 of the gas inlet. In the illustrated embodiment, the gas flow plug 74 is threaded onto the gas flow tube 72. In such a case, the gas flow plug 74 has internal threads and the gas flow tube 72 has external threads. As is further shown in FIG. 11, the gas flow plug 74 includes an external annular channel 82 in which an O-ring 84 is provided to prevent gas leakage. The gas flow plug 74 further includes an inner passage 86 in which the gas flow tube 72 is received and that is in fluid communication with the tube's inner passage 76.

During use of the hybrid foil bearing 60, pressurized gas can be pumped through the gas inlets 68 formed in the outer bearing sleeve 62 and into the inner passages 86 formed in the gas flow plugs 74. The gas then passes through the gas flow tubes 72 to the gas outlets 70 formed in the foils 64 so that the gas can be injected into the bearing 60 toward the shaft that is supported within the bearing. As can be appreciated from the above discussion, the gas inlets 68, gas flow plugs 74, gas flow tubes 72, and gas outlets 70 together define multiple radial flow paths through which the pressurized gas can be radially injected into the bearing 70 to provide a cushion of gas that supports the shaft.

Figure 8:
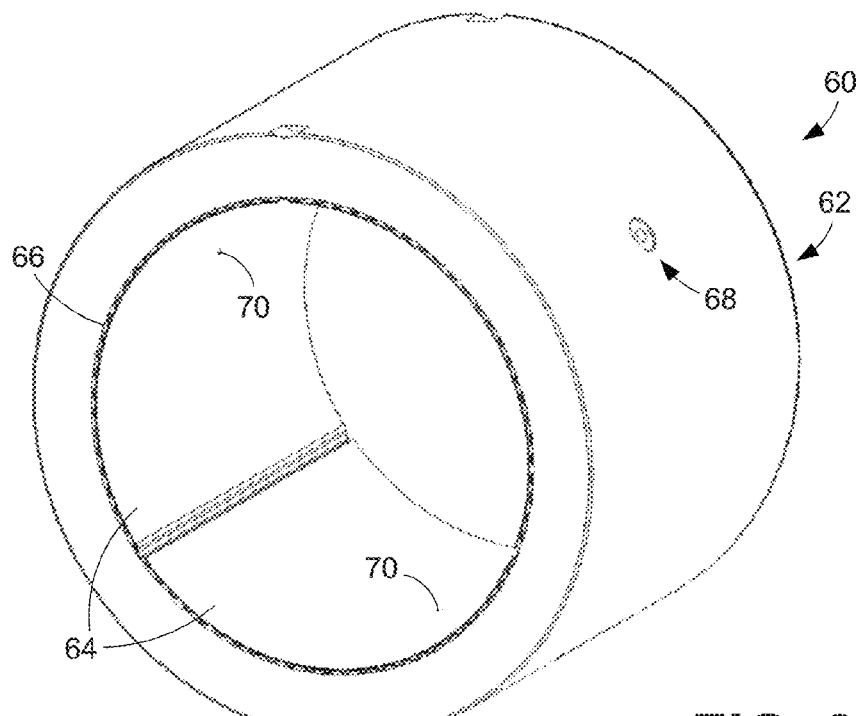
FIG. 8 is a perspective view of a second embodiment of a hybrid foil bearing.
Figure 12:
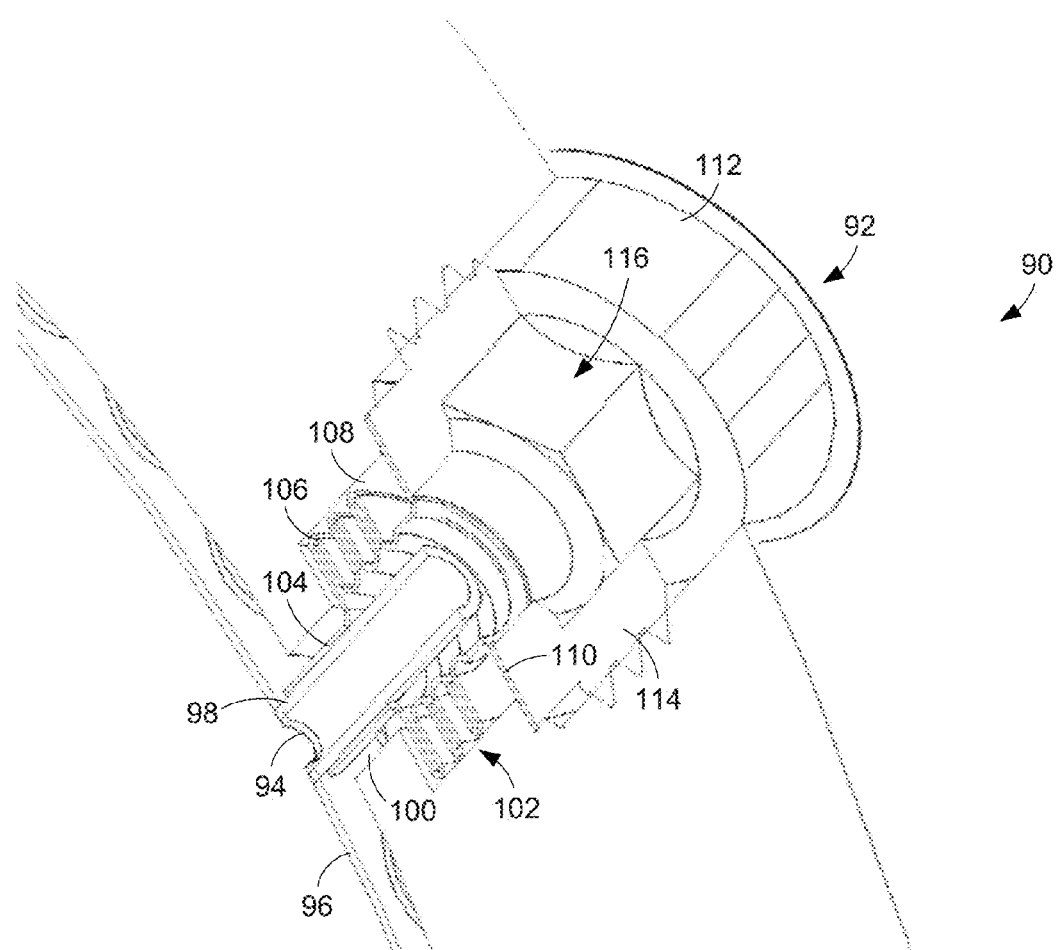
FIG. 12 is a cross-section perspective view of an alternative embodiment of a gas flow paths that can be used in the hybrid foil bearing of FIG. 8.

FIG. 12 illustrates an alternative integrated flow path that can be used in a hybrid foil bearing, such as one similar to the hybrid foil bearing 60 shown in FIG. 8. In this alternative, the bearing sleeve 90 is also provided with multiple gas inlets 92 through which pressurized gas can flow to gas outlets 94 of foils 96 of the bearing. Gas flow tubes 98 can extend radially outward from the back or outer sides of the foils 96 though a relatively narrow inner portion 100 of the gas inlet 92 of the bearing sleeve 90. These gas flow tubes 98 can be received by flexible bellows 102 that are seated within the gas inlet 92. As shown in FIG. 12, the bellows 102 can include a cylindrical tube 104 that extends into the narrow inner portion 100 of the gas inlet 92 and directly receives (and contacts) the gas flow tube 98, and a corrugated portion 106 that is contained within a relatively wider intermediate portion 108 of the gas inlet. The bellows 102 further includes a flange 110 that seats within a still relatively wider outer portion 112 of the gas inlet 92 of the bearing sleeve 90, which is held in place by a set screw 114 that threads into the outer portion. The set screw 114 includes an inner passage 116 though which pressurized gas can flow through the screw to the bellows 102. Notably, in other embodiments, the bellows 102 can be replaced by a simple flexible (e.g., plastic) tube.

When a hybrid foil bearing comprises the components illustrated in FIG. 11, pressurized gas can be pumped through the gas inlets 92 formed in the outer bearing sleeve 90 and into the inner passages 116 formed in the set screws 114. The gas then passes through the bellows 102, through the gas flow tubes 98, and to the gas outlets 94 formed in the foils 96 so that the gas can be injected into the bearing toward the shaft that is supported within the bearing. As can be appreciated from the above discussion, the gas inlets 92, set screws 114, bellows 102, gas flow tubes 98, and gas outlets 94 together define multiple radial flow paths through which the pressurized gas can be radially injected into the bearing to provide a cushion of gas that supports the shaft at least until the shaft reaches normal operating speed of rotation.

Although particular embodiments have been illustrated and described, it is noted that, in alternative embodiments, the radial flow paths described above can be implemented along the axial or longitudinal direction as well as circumferential direction within the foil.

The invention claimed is:

1. A hybrid foil bearing comprising:
   a bearing sleeve comprising multiple gas inlets to which pressurized gas can be delivered;
   multiple gas flow plugs provided in the gas inlets through which the pressurized gas can flow; and
   multiple inner foils provided within the bearing sleeve, the inner foils having gas outlets from which the pressurized gas can be injected into an interior of the bearing;
   wherein the gas inlets, gas flow plugs, and gas outlets form part of integrated gas flow paths that radially extend through the bearing sleeve and deliver the pressurized gas to the interior of the bearing.

2. The bearing of claim 1, further comprising flexible bellows connected to the gas flow plugs through which the pressurized gas can flow, the bellows each comprising corrugations.

3. The bearing of claim 2, further comprising gas distribution members connected to the bellows and the inner foils through which the pressurized gas can flow to the gas outlets of the inner foils, wherein each inner foil comprises multiple gas outlets and each gas distribution member distributes the gas to the multiple gas outlets of one inner foil.

4. The bearing of claim 3, wherein the gas distribution members are elongated and extend along a longitudinal direction of the bearing, the gas distribution members each comprising an elongated inner channel through which the pressurized gas can flow.

5. The bearing of claim 4, wherein the bearing sleeve comprises multiple elongated channels that extend along the longitudinal direction of the bearing in which the gas distribution members are received.

6. The bearing of claim 1, wherein each inner foil comprises a gas flow tube that radially extends from a back side of the inner foil through an inner portion of one of the gas inlets of the bearing sleeve, wherein each gas flow tube is received by a gas flow plug.

7. The bearing of claim 6, wherein each gas flow plug is provided in an outer portion of one of the gas inlets of the bearing sleeve and is threaded onto one of the gas flow tubes.

8. The bearing of claim 7, wherein the gas flow plugs each comprise an O-ring that forms a seal between the gas flow plug and the gas inlet in which it is provided.

9. The bearing of claim 1, further comprising bump foils that support and cushion the inner foils.

10. The bearing of claim 1, wherein the inner foils are intermediate foils and further comprising a top foil that overlies the intermediate foils.

11. The bearing of claim 10, wherein the top foil comprises flow openings that align with the gas outlets of the intermediate foils.

12. A method for injecting pressurized gas into a hybrid foil bearing, the method comprising:

pumping pressurized gas to multiple gas inlets of a sleeve of the bearing;

delivering the pressurized gas through multiple integrated flow paths that radially extend through the bearing sleeve to multiple inner foils of the bearing, the integrated flow paths each comprising a gas flow plug provided in a gas inlet of the bearing sleeve through which the pressurized gas flows; and ejecting the pressurized gas from gas outlets of the inner foils into an interior of the bearing.

13. A hybrid foil bearing comprising:

a bearing sleeve comprising multiple gas inlets to which pressurized gas can be delivered;

multiple flexible bellows provided in the gas inlets through which the pressurized gas can flow; and multiple inner foils provided within the bearing sleeve, the inner foils being connected to the flexible bellows and having gas outlets from which the pressurized gas can be injected into an interior of the bearing;

wherein the gas inlets, flexible bellows, and gas outlets form part of integrated gas flow paths that radially extend through the bearing sleeve and deliver the pressurized gas to the interior of the bearing.

14. The bearing of claim 13, wherein the flexible bellows each comprise corrugations and a cylindrical tube that is attached to an inner foil.

15. The bearing of claim 14, further comprising multiple set screws that hold the flexible bellows in place within the gas inlets, the set screws each having an inner passage through which the pressurized gas can flow to the flexible bellows.

16. A method for injecting pressurized gas into a hybrid foil bearing, the method comprising:

pumping pressurized gas to multiple gas inlets of a sleeve of the bearing;

delivering the pressurized gas through multiple integrated flow paths that radially extend through the bearing sleeve to multiple inner foils of the bearing, the integrated flow paths each comprising a flexible bellows provided in a gas inlet of the bearing sleeve through which the pressurized gas flows; and ejecting the pressurized gas from gas outlets of the inner foils into an interior of the bearing.

* * * * *